US009983588B2

(12) United States Patent
Houle et al.

(10) Patent No.: US 9,983,588 B2
(45) Date of Patent: May 29, 2018

(54) VEHICLE POSITIONING AND OBJECT AVOIDANCE

(71) Applicant: Hand Held Products, Inc., Fort Mill, SC (US)

(72) Inventors: Scott Xavier Houle, Edmonds, WA (US); Jeffrey Mark Hunt, Kirkland, WA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days. days.

(21) Appl. No.: 15/007,522

(22) Filed: Jan. 27, 2016

(65) Prior Publication Data

US 2017/0212517 A1     Jul. 27, 2017

(51) Int. Cl.
| | |
|---|---|
| *B66F 9/00* | (2006.01) |
| *G05D 1/02* | (2006.01) |
| *B60W 10/18* | (2012.01) |
| *B60W 30/09* | (2012.01) |
| *B60W 30/095* | (2012.01) |

(Continued)

(52) U.S. Cl.
CPC .......... *G05D 1/0214* (2013.01); *B60W 10/18* (2013.01); *B60W 30/09* (2013.01); *B60W 30/0956* (2013.01); *B60W 50/14* (2013.01); *B66F 9/0755* (2013.01); *B66F 9/07509* (2013.01); *G05D 1/0251* (2013.01); *B60W 2050/143* (2013.01); *B60W 2420/42* (2013.01); *B60W 2720/10* (2013.01)

(58) Field of Classification Search
USPC .................................................... 701/50, 70
See application file for complete search history.

(56) References Cited

U.S. PATENT DOCUMENTS

| | | | |
|---|---|---|---|
| 3,971,065 | A | 7/1976 | Bayer |
| 4,026,031 | A | 5/1977 | Siddall et al. |

(Continued)

FOREIGN PATENT DOCUMENTS

| | | |
|---|---|---|
| AU | 2004212587 A1 | 4/2005 |
| CN | 201139117 Y | 10/2008 |

(Continued)

OTHER PUBLICATIONS

U.S. Appl. No. 14/715,916 for Evaluating Image Values filed May 19, 2015 (Ackley); 60 pages.

(Continued)

*Primary Examiner* — Jonathan L Sample
(74) *Attorney, Agent, or Firm* — Additon, Higgins & Pendleton, P.A.

(57) ABSTRACT

A system is described for presenting information relating to lifting and moving a load object with a vehicle. Upon the lifting, a dimensioner determines a size and a shape of the load object, computes a corresponding spatial representation, and generates a corresponding video signal. During the moving, an imager observes a scene in front of the vehicle, relative to its forward motion direction, and generates a video signal corresponding to the observed scene. The imager has at least one element moveable vertically, relative to the lifting. A display renders a real time visual representation of the scene observed in front of the vehicle based on the corresponding video signal and superimposes a representation of the computed spatial representation of the load object.

20 Claims, 7 Drawing Sheets

(51) Int. Cl.
  *B60W 50/14* (2012.01)
  *B66F 9/075* (2006.01)

(56) References Cited

U.S. PATENT DOCUMENTS

| | | | |
|---|---|---|---|
| 4,279,328 A * | 7/1981 | Ahlbom | B66F 9/0755 180/169 |
| 4,398,811 A | 8/1983 | Nishioka et al. | |
| 4,495,559 A | 1/1985 | Gelatt, Jr. | |
| 4,730,190 A | 3/1988 | Win et al. | |
| 4,803,639 A | 2/1989 | Steele et al. | |
| 5,175,601 A | 12/1992 | Fitts | |
| 5,184,733 A | 2/1993 | Amarson et al. | |
| 5,198,648 A | 3/1993 | Hibbard | |
| 5,220,536 A | 6/1993 | Stringer et al. | |
| 5,331,118 A | 7/1994 | Jensen | |
| 5,359,185 A | 10/1994 | Hanson | |
| 5,384,901 A | 1/1995 | Glassner et al. | |
| 5,548,707 A | 8/1996 | LoNegro et al. | |
| 5,555,090 A | 9/1996 | Schmutz | |
| 5,561,526 A | 10/1996 | Huber et al. | |
| 5,590,060 A | 12/1996 | Granville et al. | |
| 5,606,534 A | 2/1997 | Stringer et al. | |
| 5,619,245 A | 4/1997 | Kessler et al. | |
| 5,655,095 A | 8/1997 | LoNegro et al. | |
| 5,661,561 A | 8/1997 | Wurz et al. | |
| 5,699,161 A | 12/1997 | Woodworth | |
| 5,729,750 A | 3/1998 | Ishida | |
| 5,730,252 A | 3/1998 | Herbinet | |
| 5,732,147 A | 3/1998 | Tao | |
| 5,734,476 A | 3/1998 | Dlugos | |
| 5,737,074 A | 4/1998 | Haga et al. | |
| 5,748,199 A | 5/1998 | Palm | |
| 5,767,962 A | 6/1998 | Suzuki et al. | |
| 5,831,737 A | 11/1998 | Stringer et al. | |
| 5,850,370 A | 12/1998 | Stringer et al. | |
| 5,850,490 A | 12/1998 | Johnson | |
| 5,869,827 A | 2/1999 | Rando | |
| 5,870,220 A | 2/1999 | Migdal et al. | |
| 5,900,611 A | 5/1999 | Hecht | |
| 5,923,428 A | 7/1999 | Woodworth | |
| 5,929,856 A | 7/1999 | LoNegro et al. | |
| 5,938,710 A * | 8/1999 | Lanza | B66F 9/063 180/169 |
| 5,959,568 A * | 9/1999 | Woolley | G01S 5/0289 235/385 |
| 5,960,098 A | 9/1999 | Tao | |
| 5,969,823 A | 10/1999 | Wurz et al. | |
| 5,978,512 A | 11/1999 | Kim et al. | |
| 5,979,760 A | 11/1999 | Freyman et al. | |
| 5,988,862 A | 11/1999 | Kacyra et al. | |
| 5,991,041 A | 11/1999 | Woodworth | |
| 6,009,189 A | 12/1999 | Schaack | |
| 6,025,847 A | 2/2000 | Marks | |
| 6,035,067 A | 3/2000 | Ponticos | |
| 6,049,386 A | 4/2000 | Stringer et al. | |
| 6,053,409 A | 4/2000 | Brobst et al. | |
| 6,064,759 A | 5/2000 | Buckley et al. | |
| 6,067,110 A | 5/2000 | Nonaka et al. | |
| 6,069,696 A | 5/2000 | McQueen et al. | |
| 6,115,114 A | 9/2000 | Berg et al. | |
| 6,137,577 A | 10/2000 | Woodworth | |
| 6,177,999 B1 | 1/2001 | Wurz et al. | |
| 6,189,223 B1 | 2/2001 | Haug | |
| 6,232,597 B1 | 5/2001 | Kley | |
| 6,236,403 B1 | 5/2001 | Chaki | |
| 6,246,468 B1 | 6/2001 | Dimsdale | |
| 6,333,749 B1 * | 12/2001 | Reinhardt | G01C 11/00 345/619 |
| 6,336,587 B1 | 1/2002 | He et al. | |
| 6,369,401 B1 | 4/2002 | Lee | |
| 6,373,579 B1 | 4/2002 | Ober et al. | |
| 6,429,803 B1 | 8/2002 | Kumar | |
| 6,457,642 B1 | 10/2002 | Good et al. | |
| 6,507,406 B1 | 1/2003 | Yagi et al. | |
| 6,517,004 B2 | 2/2003 | Good et al. | |
| 6,519,550 B1 | 2/2003 | D'Hooge et al. | |
| 6,535,776 B1 | 3/2003 | Tobin et al. | |
| 6,674,904 B1 | 1/2004 | McQueen | |
| 6,705,526 B1 | 3/2004 | Zhu et al. | |
| 6,781,621 B1 | 8/2004 | Gobush et al. | |
| 6,824,058 B2 | 11/2004 | Patel et al. | |
| 6,832,725 B2 | 12/2004 | Gardiner et al. | |
| 6,858,857 B2 | 2/2005 | Pease et al. | |
| 6,922,632 B2 | 7/2005 | Foxlin | |
| 6,971,580 B2 | 12/2005 | Zhu et al. | |
| 6,995,762 B1 | 2/2006 | Pavlidis et al. | |
| 7,057,632 B2 | 6/2006 | Yamawaki et al. | |
| 7,085,409 B2 | 8/2006 | Sawhney et al. | |
| 7,086,162 B2 | 8/2006 | Tyroler | |
| 7,104,453 B1 | 9/2006 | Zhu et al. | |
| 7,128,266 B2 | 10/2006 | Marlton et al. | |
| 7,137,556 B1 | 11/2006 | Bonner et al. | |
| 7,159,783 B2 | 1/2007 | Walczyk et al. | |
| 7,161,688 B1 | 1/2007 | Bonner et al. | |
| 7,205,529 B2 | 4/2007 | Andersen et al. | |
| 7,214,954 B2 | 5/2007 | Schopp | |
| 7,277,187 B2 | 10/2007 | Smith et al. | |
| 7,307,653 B2 | 12/2007 | Dutta | |
| 7,310,431 B2 | 12/2007 | Gokturk et al. | |
| 7,413,127 B2 | 8/2008 | Ehrhart et al. | |
| 7,509,529 B2 | 3/2009 | Colucci et al. | |
| 7,527,205 B2 | 5/2009 | Zhu | |
| 7,586,049 B2 | 9/2009 | Wurz | |
| 7,602,404 B1 | 10/2009 | Reinhardt et al. | |
| 7,639,722 B1 | 12/2009 | Paxton et al. | |
| 7,726,575 B2 | 6/2010 | Wang et al. | |
| 7,780,084 B2 | 8/2010 | Zhang et al. | |
| 7,788,883 B2 | 9/2010 | Buckley et al. | |
| 7,974,025 B2 | 7/2011 | Topliss | |
| 8,027,096 B2 | 9/2011 | Feng et al. | |
| 8,028,501 B2 | 10/2011 | Buckley et al. | |
| 8,050,461 B2 | 11/2011 | Shpunt et al. | |
| 8,055,061 B2 | 11/2011 | Katano | |
| 8,072,581 B1 | 12/2011 | Breiholz | |
| 8,102,395 B2 | 1/2012 | Kondo et al. | |
| 8,132,728 B2 | 3/2012 | Dwinell et al. | |
| 8,134,717 B2 | 3/2012 | Pangrazio et al. | |
| 8,149,224 B1 | 4/2012 | Kuo et al. | |
| 8,194,097 B2 | 6/2012 | Xiao et al. | |
| 8,201,737 B1 | 6/2012 | Palacios Durazo et al. | |
| 8,212,889 B2 | 7/2012 | Chanas et al. | |
| 8,228,510 B2 | 7/2012 | Pangrazio et al. | |
| 8,230,367 B2 | 7/2012 | Bell et al. | |
| 8,294,969 B2 | 10/2012 | Plesko | |
| 8,305,458 B2 | 11/2012 | Hara | |
| 8,310,656 B2 | 11/2012 | Zalewski | |
| 8,313,380 B2 | 11/2012 | Zalewski et al. | |
| 8,317,105 B2 | 11/2012 | Kotlarsky et al. | |
| 8,322,622 B2 | 12/2012 | Suzhou et al. | |
| 8,339,462 B2 | 12/2012 | Stec et al. | |
| 8,350,959 B2 | 1/2013 | Topliss et al. | |
| 8,351,670 B2 | 1/2013 | Ijiri et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,976 B2 | 2/2013 | Mohideen et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,437,539 B2 | 5/2013 | Komatsu et al. | |
| 8,441,749 B2 | 5/2013 | Brown et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,463,079 B2 | 6/2013 | Ackley et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |

(56) References Cited

U.S. PATENT DOCUMENTS

| | | |
|---|---|---|
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,594,425 B2 | 11/2013 | Gurman et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1 | 8/2014 | Hilde |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,897,596 B1 | 11/2014 | Passmore et al. |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,928,896 B2 | 1/2015 | Kennington et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |

(56) References Cited

U.S. PATENT DOCUMENTS

| | | |
|---|---|---|
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,014,441 B2 | 4/2015 | Truyen et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,082,195 B2 * | 7/2015 | Holeva ................ G06T 7/0085 |
| 9,142,035 B1 | 9/2015 | Rotman |
| 9,171,278 B1 | 10/2015 | Kong et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,233,470 B1 | 1/2016 | Bradski et al. |
| 9,235,899 B1 | 1/2016 | Kirmani et al. |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,299,013 B1 | 3/2016 | Curlander et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| 9,424,749 B1 * | 8/2016 | Reed .................... G08G 1/07 |
| D766,244 S | 9/2016 | Zhou et al. |
| 9,443,222 B2 | 9/2016 | Singel et al. |
| 9,478,113 B2 | 10/2016 | Xie et al. |
| 9,486,921 B1 * | 11/2016 | Straszheim .......... B25J 9/1679 |
| 9,828,223 B2 * | 11/2017 | Svensson ............ B66F 9/0755 |
| 2001/0027995 A1 | 10/2001 | Patel et al. |
| 2001/0032879 A1 | 10/2001 | He et al. |
| 2002/0054289 A1 | 5/2002 | Thibault et al. |
| 2002/0067855 A1 | 6/2002 | Chiu et al. |
| 2002/0105639 A1 | 8/2002 | Roelke |
| 2002/0109835 A1 | 8/2002 | Goetz |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0078755 A1 | 4/2003 | Leutz et al. |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 * | 4/2004 | Ichijo .................... B66F 9/0755 701/50 |
| 2004/0083025 A1 * | 4/2004 | Yamanouchi ......... B66F 9/0755 700/213 |
| 2004/0089482 A1 | 5/2004 | Ramsden et al. |
| 2004/0098146 A1 * | 5/2004 | Katae .................. B66F 9/0755 700/50 |
| 2004/0105580 A1 * | 6/2004 | Hager .................... G06K 9/32 382/154 |
| 2004/0118928 A1 | 6/2004 | Patel et al. |
| 2004/0122779 A1 | 6/2004 | Stickler et al. |
| 2004/0132297 A1 | 7/2004 | Baba et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Popescu et al. |
| 2005/0128196 A1 | 6/2005 | Popescu et al. |
| 2005/0168488 A1 | 8/2005 | Montague |
| 2005/0211782 A1 | 9/2005 | Martin |
| 2005/0257748 A1 | 11/2005 | Kriesel et al. |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0109105 A1 | 5/2006 | Varner et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0213999 A1 | 9/2006 | Wang et al. |
| 2006/0232681 A1 | 10/2006 | Okada |
| 2006/0255150 A1 | 11/2006 | Longacre |
| 2006/0269165 A1 | 11/2006 | Viswanathan |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 * | 8/2007 | Lewin ................ B62D 15/0285 348/118 |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0047760 A1 | 2/2008 | Georgitsis |
| 2008/0050042 A1 | 2/2008 | Zhang et al. |

(56) References Cited

U.S. PATENT DOCUMENTS

| | | |
|---|---|---|
| 2008/0056536 A1 | 3/2008 | Hildreth et al. |
| 2008/0062164 A1 | 3/2008 | Bassi et al. |
| 2008/0077265 A1 | 3/2008 | Boyden |
| 2008/0079955 A1 | 4/2008 | Storm |
| 2008/0164074 A1 | 6/2008 | Wurz |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0059004 A1 | 3/2009 | Bochicchio |
| 2009/0081008 A1 | 3/2009 | Somin et al. |
| 2009/0095047 A1 | 4/2009 | Patel et al. |
| 2009/0134221 A1 | 5/2009 | Zhu et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Arnz |
| 2010/0274728 A1 | 10/2010 | Kugelman |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0043609 A1 | 2/2011 | Choi et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1* | 9/2011 | Mellin ............... B66F 9/0755 340/435 |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0260965 A1* | 10/2011 | Kim ..................... G06F 3/013 345/156 |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0297590 A1 | 12/2011 | Ackley et al. |
| 2011/0301994 A1 | 12/2011 | Tieman |
| 2011/0303748 A1* | 12/2011 | Lemma ............... G06K 7/1417 235/454 |
| 2011/0310227 A1 | 12/2011 | Konertz et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0140300 A1 | 6/2012 | Freeman |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 9/2012 | Rodriguez et al. |
| 2012/0223141 A1 | 9/2012 | Good et al. |
| 2012/0224026 A1 | 9/2012 | Bayer et al. |
| 2012/0224060 A1* | 9/2012 | Gurevich ................ B60R 1/00 348/148 |
| 2012/0236288 A1 | 9/2012 | Stanley |
| 2012/0242852 A1 | 9/2012 | Hayward et al. |
| 2012/0256901 A1 | 10/2012 | Bendall |
| 2012/0261474 A1 | 10/2012 | Kawashime et al. |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294549 A1 | 11/2012 | Doepke |
| 2012/0299961 A1 | 11/2012 | Ramkumar et al. |
| 2012/0300991 A1 | 11/2012 | Mikio |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0075168 A1 | 3/2013 | Amundsen et al. |
| 2013/0093895 A1* | 4/2013 | Palmer .................. G08G 1/04 348/149 |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0201288 A1 | 8/2013 | Billerbaeck et al. |
| 2013/0208164 A1 | 8/2013 | Cazier et al. |
| 2013/0211790 A1 | 8/2013 | Loveland et al. |
| 2013/0222592 A1* | 8/2013 | Gieseke .................. G08G 1/04 348/148 |
| 2013/0223673 A1 | 8/2013 | Davis et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308013 A1 | 11/2013 | Li et al. |
| 2013/0308625 A1 | 11/2013 | Corcoran |
| 2013/0313324 A1 | 11/2013 | Koziol et al. |

(56) References Cited

U.S. PATENT DOCUMENTS

| | | |
|---|---|---|
| 2013/0313325 A1 | 11/2013 | Wilz et al. |
| 2013/0329012 A1 | 12/2013 | Bartos |
| 2013/0329013 A1 | 12/2013 | Metois et al. |
| 2013/0342342 A1 | 12/2013 | Sabre et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0009586 A1 | 1/2014 | McNamer et al. |
| 2014/0019005 A1* | 1/2014 | Lee .................. G08G 1/166 701/36 |
| 2014/0021259 A1 | 1/2014 | Moed et al. |
| 2014/0025584 A1 | 1/2014 | Liu et al. |
| 2014/0031665 A1 | 1/2014 | Pinto et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039674 A1 | 2/2014 | Motoyama et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058612 A1* | 2/2014 | Wong .................. B66F 9/063 701/25 |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0064624 A1 | 3/2014 | Kim et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0079297 A1 | 3/2014 | Tadayon et al. |
| 2014/0091147 A1 | 4/2014 | Evans et al. |
| 2014/0097238 A1 | 4/2014 | Ghazizadeh |
| 2014/0098091 A1 | 4/2014 | Hod |
| 2014/0098243 A1 | 4/2014 | Ghazizadeh |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Taskahashi |
| 2014/0140585 A1 | 5/2014 | Wang |
| 2014/0142398 A1 | 5/2014 | Patil et al. |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1* | 6/2014 | Adami .................. B66F 9/0755 187/222 |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0177931 A1 | 6/2014 | Kocherscheidt et al. |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0201126 A1 | 7/2014 | Zadeh et al. |
| 2014/0203087 A1 | 7/2014 | Smith et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0232930 A1 | 8/2014 | Anderson |
| 2014/0240454 A1 | 8/2014 | Lee et al. |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1 | 10/2014 | Ricci |
| 2014/0307855 A1 | 10/2014 | Withagen et al. |
| 2014/0312121 A1 | 10/2014 | Lu et al. |
| 2014/0313527 A1 | 10/2014 | Askan |
| 2014/0319219 A1 | 10/2014 | Liu et al. |
| 2014/0319220 A1 | 10/2014 | Coyle |
| 2014/0319221 A1 | 10/2014 | Oberpriller et al. |
| 2014/0320408 A1 | 10/2014 | Zagorsek et al. |
| 2014/0326787 A1 | 11/2014 | Barten |
| 2014/0332590 A1 | 11/2014 | Wang et al. |
| 2014/0333775 A1 | 11/2014 | Naikal et al. |
| 2014/0344943 A1 | 11/2014 | Todeschini et al. |
| 2014/0346233 A1 | 11/2014 | Liu et al. |
| 2014/0347533 A1 | 11/2014 | Ovsiannikov et al. |
| 2014/0350710 A1 | 11/2014 | Gopalkrishnan et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |

(56) References Cited

U.S. PATENT DOCUMENTS

| | | |
|---|---|---|
| 2015/0001304 A1 | 1/2015 | Todeschini |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0036876 A1 | 2/2015 | Marrion et al. |
| 2015/0039309 A1 | 2/2015 | Braho et al. |
| 2015/0040378 A1 | 2/2015 | Saber et al. |
| 2015/0042791 A1 | 2/2015 | Metois et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0070158 A1* | 3/2015 | Hayasaka ............... G01S 7/04 340/438 |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0116498 A1* | 4/2015 | Vartiainen ............ G05B 19/042 348/159 |
| 2015/0117749 A1 | 4/2015 | Chen et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0163474 A1 | 6/2015 | You |
| 2015/0169925 A1 | 6/2015 | Chang et al. |
| 2015/0169929 A1 | 6/2015 | Williams et al. |
| 2015/0178900 A1 | 6/2015 | Kim et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0201181 A1 | 7/2015 | Moore et al. |
| 2015/0204662 A1 | 7/2015 | Kobayashi et al. |
| 2015/0204671 A1 | 7/2015 | Showering |
| 2015/0210199 A1 | 7/2015 | Payne |
| 2015/0213647 A1 | 7/2015 | Laffargue et al. |
| 2015/0219748 A1* | 8/2015 | Hyatt ................... G01S 13/74 342/450 |
| 2015/0220753 A1 | 8/2015 | Zhu et al. |
| 2015/0229838 A1 | 8/2015 | Hakim et al. |
| 2015/0254485 A1 | 9/2015 | Feng et al. |
| 2015/0269403 A1 | 9/2015 | Lei et al. |
| 2015/0276379 A1 | 10/2015 | Ni et al. |
| 2015/0301181 A1* | 10/2015 | Herschbach ............ G01S 17/48 356/603 |
| 2015/0308816 A1 | 10/2015 | Laffargue et al. |
| 2015/0316368 A1 | 11/2015 | Moench et al. |
| 2015/0325036 A1 | 11/2015 | Lee |
| 2015/0327012 A1 | 11/2015 | Bian et al. |
| 2015/0332463 A1* | 11/2015 | Galera ............... G06K 9/00771 382/103 |
| 2015/0355470 A1 | 12/2015 | Herschbach |
| 2016/0014251 A1 | 1/2016 | Hejl |
| 2016/0169665 A1 | 1/2016 | Deschenes et al. |
| 2016/0040982 A1 | 2/2016 | Li et al. |
| 2016/0042241 A1 | 2/2016 | Todeschini |
| 2016/0048725 A1* | 2/2016 | Holz ..................... G01P 13/00 345/156 |
| 2016/0057230 A1 | 2/2016 | Todeschini et al. |
| 2016/0070982 A1 | 2/2016 | Li et al. |
| 2016/0063429 A1 | 3/2016 | Varley et al. |
| 2016/0065912 A1 | 3/2016 | Peterson |
| 2016/0088287 A1 | 3/2016 | Sadi et al. |
| 2016/0090283 A1* | 3/2016 | Svensson ................. B66F 9/14 701/50 |
| 2016/0090284 A1* | 3/2016 | Svensson ................. B66F 9/07 701/50 |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1* | 4/2016 | Ackley ............... H04N 5/23222 348/207.11 |
| 2016/0112643 A1* | 4/2016 | Laffargue ............. G01B 11/14 348/46 |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0138247 A1* | 5/2016 | Conway ................. G01S 7/22 701/50 |
| 2016/0138248 A1* | 5/2016 | Conway ................. E02F 3/847 701/32.3 |
| 2016/0138249 A1* | 5/2016 | Conway ................. E02F 9/261 701/50 |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0187186 A1* | 6/2016 | Coleman ............... B65G 15/30 198/340 |
| 2016/0187187 A1* | 6/2016 | Coleman ............. G01G 19/083 177/45 |
| 2016/0187210 A1* | 6/2016 | Coleman ............. G01G 19/083 73/862.639 |
| 2016/0189087 A1 | 6/2016 | Morton et al. |
| 2016/0191801 A1 | 6/2016 | Sivan |
| 2016/0125873 A1 | 7/2016 | Braho et al. |
| 2016/0202478 A1 | 7/2016 | Masson et al. |
| 2016/0203641 A1* | 7/2016 | Bostick ............. G02B 27/0172 345/633 |
| 2016/0223474 A1 | 8/2016 | Tang et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314301 A1 | 10/2016 | Sewell et al. |
| 2016/0314294 A1 | 10/2016 | Kubler et al. |
| 2016/0343176 A1* | 11/2016 | Ackley ..................... G06K 9/18 |
| 2017/0115490 A1 | 4/2017 | Hsieh et al. |
| 2017/0121158 A1* | 5/2017 | Wong ................... B66F 9/063 |
| 2010/7018294 | 6/2017 | Hardy et al. |

FOREIGN PATENT DOCUMENTS

| | | |
|---|---|---|
| DE | 3335760 A1 | 4/1985 |
| DE | 10210813 A1 | 10/2003 |
| DE | 102007037282 A1 | 3/2008 |

(56) References Cited

FOREIGN PATENT DOCUMENTS

| | | | |
|---|---|---|---|
| EP | 1111435 | A2 | 6/2001 |
| EP | 1443312 | A1 | 8/2004 |
| EP | 1232480 | B1 | 5/2006 |
| EP | 2013117 | A1 | 1/2009 |
| EP | 2286932 | A2 | 2/2011 |
| EP | 2372648 | A2 | 10/2011 |
| EP | 2381421 | A2 | 10/2011 |
| EP | 2533009 | A1 | 12/2012 |
| EP | 2562715 | A1 | 2/2013 |
| EP | 2722656 | A1 | 4/2014 |
| EP | 2779027 | A1 | 9/2014 |
| EP | 2833323 | A2 | 2/2015 |
| EP | 2843590 | A2 | 3/2015 |
| EP | 2845170 | A1 | 3/2015 |
| EP | 2966595 | A1 | 1/2016 |
| EP | 3006893 | A1 | 3/2016 |
| EP | 3012601 | A1 | 3/2016 |
| EP | 3007096 | A1 | 4/2016 |
| GB | 2503978 | A1 | 1/2014 |
| GB | 2525053 | A | 10/2015 |
| GB | 2531928 | A | 5/2016 |
| JP | H04129902 | A | 4/1992 |
| JP | 200696457 | A | 4/2006 |
| JP | 2007084162 | A | 4/2007 |
| JP | 2008210276 | A | 9/2008 |
| JP | 2014210646 | A | 11/2014 |
| JP | 2015174705 | A | 10/2015 |
| KR | 20100020115 | A | 2/2010 |
| KR | 20110013200 | A | 2/2011 |
| KR | 20110117020 | A | 10/2011 |
| KR | 20120028109 | A | 3/2012 |
| WO | 96/40452 | A1 | 12/1996 |
| WO | 0077726 | A1 | 12/2000 |
| WO | 0114836 | A1 | 3/2001 |
| WO | 2006095110 | A1 | 9/2006 |
| WO | 2007015059 | A1 | 2/2007 |
| WO | 200712554 | A1 | 11/2007 |
| WO | 2011017241 | A1 | 2/2011 |
| WO | 2012175731 | A1 | 12/2012 |
| WO | 2013021157 | A1 | 2/2013 |
| WO | 2013033442 | A1 | 3/2013 |
| WO | 2013163789 | A1 | 11/2013 |
| WO | 2013166368 | A1 | 11/2013 |
| WO | 2013173985 | A1 | 11/2013 |
| WO | 20130184340 | A1 | 12/2013 |
| WO | 2014019130 | A1 | 2/2014 |
| WO | 2014023697 | A1 | 2/2014 |
| WO | 2014102341 | A1 | 7/2014 |
| WO | 2014110495 | A1 | 7/2014 |
| WO | 2014149702 | A1 | 9/2014 |
| WO | 2014151746 | A1 | 9/2014 |
| WO | 2015006865 | A1 | 1/2015 |
| WO | 2016020038 | A1 | 2/2016 |
| WO | 2016061699 | A1 | 4/2016 |

OTHER PUBLICATIONS

U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 14 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.
Chinese Notice of Reexamination in related Chinese Application 201520810313.3, dated Mar. 14, 2017, English computer Translation provided, 7 pages [No new art cited].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017].
Throlabs, Examiner Cited NPL in Advisory Action dated Apr. 12, 2017 in related commonly owned application, downloaded from https://www.thorlabs.com/newgrouppage9.cfm?objectgroup_id=6430, 4 pages.
Eksma Optics, Examiner Cited NPL in Advisory Action dated Apr. 12, 2017 in related commonly owned application, downloaded from http://eksmaoptics.com/optical-systems/f-theta-lens-for-1064-nm/, 2 pages.
Sill Optics, Examiner Cited NPL in Advisory Action dated Apr. 12, 2017 in related commonly owned application, http://www.silloptics.de/1/products/sill-encyclopedia/laser-optics/f-theta-lenses/, 4 pages.
European extended search report in related EP Application 16190833.0, dated Mar. 9, 2017, 8 pages. [only new art has been cited; US Publication 2014/0034731 was previously cited].
United Kingdom Combined Search and Examination Report in related Application No. GB1620676.5, dated Mar. 8, 2017, 6 pages [References have been previously cited; WO2014/151746, WO2012/175731, US 2014/0313527, GB2503978].
European Exam Report in related , EP Application No. 16168216.6, dated Feb. 27, 2017, 5 pages, [References have been previously cited; WO2011/017241 and US 2014/0104413].
European Examination report in related EP Application No. 14181437.6, dated Feb. 8, 2017, 5 pages.
Peter Clarke, Actuator Developer Claims Anti-Shake Breakthrough for Smartphone Cams, Electronic Engineering Times, p. 24, May 16, 2011.
Spiller, Jonathan; Object Localization Using Deformable Templates, Master's Dissertation, University of the Witwatersrand, Johannesburg, South Africa, 2007; 74 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
European Search Report for application No. EP13186043 dated Feb. 26, 2014 (now EP2722656 (Apr. 23, 2014)): Total pp. 7.
International Search Report for PCT/US2013/039438 (WO2013166368), dated Oct. 1, 2013, 7 pages.
Lloyd, Ryan and Scott McCloskey, "Recognition of 3D Package Shapes for Singe Camera Metrology" IEEE Winter Conference on

(56) References Cited

OTHER PUBLICATIONS

Applications of computer Visiona, IEEE, Mar. 24, 2014, pp. 99-106, {retrieved on Jun. 16, 2014}, Authors are employees of common Applicant.
European Office Action for application EP 13186043, dated Jun. 12, 2014(now EP2722656 (Apr. 23, 2014)), Total of 6 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
U.S. Appl. No. 14/801,023, Tyler Doornenbal et al., filed Jul. 16, 2015, not published yet, Adjusting Dimensioning Results Using Augmented Reality, 39 pages.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
European Patent Office Action for Application No. 14157971.4-1906, dated Jul. 16, 2014, 5 pages.
European Patent Search Report for Application No. 14157971.4-1906, dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008) , 6 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Proesmans, Marc et al. "Active Acquisition of 3D Shape for Moving Objects" 0-7803-3258-X/96 1996 IEEE; 4 pages.
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.
EP Search and Written Opinion Report in related matter EP Application No. 14181437.6, dated Mar. 26, 2015, 7 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Second Chinese Office Action in related CN Application No. 201520810685.6, dated Mar. 22, 2016, 5 pages, no references.
European Search Report in related EP Application No. 15190315.0, dated Apr. 1, 2016, 7 pages.
Second Chinese Office Action in related CN Application No. 2015220810562.2, dated Mar. 22, 2016, 5 pages. English Translation provided [No references].
European Search Report for related Application EP 15190249.1, dated Mar. 22, 2016, 7 pages.
Second Chinese Office Action in related CN Application No. 201520810313.3, dated Mar. 22, 2016, 5 pages. English Translation provided [No references].

U.S. Appl. No. 14/800,757 , Eric Todeschini, filed Jul. 16, 2015, not published yet, Dimensioning and Imaging Items, 80 pages.
U.S. Appl. No. 14/747,197, Serge Thuries et al., filed Jun. 23, 2015, not published yet, Optical Pattern Projector; 33 pages.
U.S. Appl. No. 14/747,490, Brian L. Jovanovski et al., filed Jun. 23, 2015, not published yet, Dual-Projector Three-Dimensional Scanner; 40 pages.
Search Report and Opinion in related GB Application No. 1517112.7, dated Feb. 19, 2016, 6 Pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating a Volume Dimensioner; 63 pages.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG 10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
European Search Report for Related EP Application No. 15189214.8, dated Mar. 3, 2016, 9 pages.
Santolaria et al. "A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages.
Search Report and Opinion in Related EP Application 15176943.7, dated Jan. 8, 2016, 8 pages.
European Search Report for related EP Application No. 15188440.0, dated Mar. 8, 2016, 8 pages.
United Kingdom Search Report in related application GB1517842.9, dated Apr. 8, 2016, 8 pages.
Great Britain Search Report for related Application On. GB1517843.7, dated Feb. 23, 2016; 8 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
McCloskey et al., "Image Transformation for Indicia Reading," U.S. Appl. No. 14/928,032, filed Oct. 30, 2015, 48 pages, not yet published.
Great Britain Combined Search and Examination Report in related Application GB1517842.9, dated Apr. 8, 2016, 8 pages.
Search Report in counterpart European Application No. 15182675.7, dated Dec. 4, 2015, 10 pages.
Wikipedia, "3D projection" Downloaded on Nov. 25, 2015 from www.wikipedia.com, 4 pages.
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.

(56) References Cited

OTHER PUBLICATIONS

European Extended Search Report in Related EP Application No. 16172995.9, dated Aug. 22, 2016, 11 pages.
European Extended search report in related EP Application No. 15190306.9, dated Sep. 9, 2016, 15 pages.
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_El -Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
H. Sprague Ackley, "Automatic Mode Switching in a Volume Dimensioner", U.S. Appl. No. 15/182,636, filed Jun. 15, 2016, 53 pages, Not yet published.
Bosch Tool Corporation, "Operating/Safety Instruction for DLR 130", dated Feb. 2, 2009, 36 pages.
European Search Report for related EP Application No. 16152477.2, dated May 24, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http;//www.outdoorphotographer.com/gear/lenses/get-the-most-out-ofvariable-aperture-lenses.html on Feb. 9, 2016].
Houle et al., "Vehical Positioning and Object Avoidance", U.S. Appl. No. 15/007,522 [not yet published], Filed Jan. 27, 2016, 59 pages.
United Kingdom combined Search and Examination Report in related GB Application No. 1607394.2, dated Oct. 19, 2016, 7 pages.
European Search Report from related EP Application No. 16168216.6, dated Oct. 20, 2016, 8 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
European Extended Search Report in related EP Application No. 16190017.0, dated Jan. 4, 2017, 6 pages.
European Extended Search Report in related EP Application No. 16173429.8, dated Dec. 1, 2016, 8 pages [Only new references cited: US 2013/0038881 was previously cited].

Extended European Search Report in related EP Application No. 16175410.0, dated Dec. 13, 2016, 5 pages.
Wikipedia, "Microlens", Downloaded from https://en.wikipedia.org/wiki/Microlens, pp. 3. }.
Fukaya et al., "Characteristics of Speckle Random Pattern and Its Applications", pp. 317-327, Nouv. Rev. Optique, t.6, n.6. (1975) {.
Padzensky, Ron; "Augmera; Gesture Control", Dated Apr. 18, 2015, 15 pages.
Grabowski, Ralph; "New Commands in AutoCADS 2010: Part 11 Smoothing 3D Mesh Objects" Dated 2011 , 6 pages.
Theodoropoulos, Gabriel; "Using Gesture Recognizers to Handle Pinch, Rotate, Pan, Swipe, and Tap Gestures" dated Aug. 25, 2014, 34 pages.
EP Search Report in related EP Application No. 17171844 dated Sep. 18, 2017. 4 pages [Only new art cited herein}.
EP Extended Search Report in related EP Applicaton No. 17174843.7 dated Oct. 17, 2017, 5 pages {Only new art cited herein}.
UK Further Exam Report in related UK Application No. GB1517842.9, dated Sep. 1, 2017, 5 pages (only new art cited herein).
Ralph Grabowski, "Smothing 3D Mesh Objects," New Commands in AutoCAD 2010: Part 11, Examiner Cited art in related matter Non Final Office Action dated May 19, 2017; 6 pages.
European Exam Report in related EP Application No. 16152477.2, dated Jun. 20, 2017, 4 pages [No art to be cited].
European Exam Report in related EP Applciation 16172995.9, dated Jul. 6, 2017, 9 pages [No new art to be cited].
United Kingdom Search Report in related Application No. GB1700338.5, dated Jun. 30, 2017, 5 pages.
European Search Report in related EP Application No. 17175357.7, dated Aug. 17, 2017, pp. 1-7 [No new art to be cited].
Boavida et al., "Dam monitoring using combined terrestrial imaging systems", 2009 Civil Engineering Survey De/Jan. 2009, pp. 33-38 {Cited in Notice of Allowance dated Sep. 15, 2017 in related matter}.
European Exam Report in related EP Application No. 15176943.7, dated Apr. 12, 2017, 6 pages [Art previously cited in this matter].
European Exam Report in related EP Application No. 15188440.0, dated Apr. 21, 2017, 4 pages [no new art to cite].
Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792.
Extended European Search report in related EP Application No. 17189496.7 dated Dec. 5, 2017; 9 pages.
Extended European Search report in related EP Application No. 17190323.0 dated Jan. 19, 2018; 6 pages.
Examination Report in related GB Application No. GB1517843.7, dated Jan. 19, 2018, 4 pages.
Examination Report in related EP Application No. 15190315, dated Jan. 26, 2018, 6 pages.
European Extended Search Report in related EP Application No. 17201794.9, dated Mar. 16, 2018, 10 pages.
European Extended Search Report in related EP Application 17205030.4, dated Mar. 22, 2018, 8 pages.
European Exam Report in related EP Application 16172995.9, dated Mar. 15, 2018, 7 pages.
United Kingdom Combined Search and Examination Report dated Mar. 21, 2018, 5 pages.

* cited by examiner

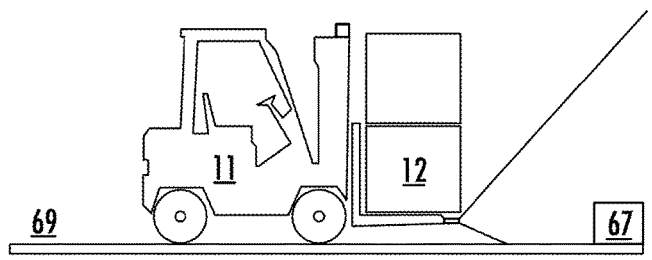
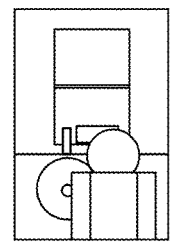
FIG. 6A  FIG. 6B
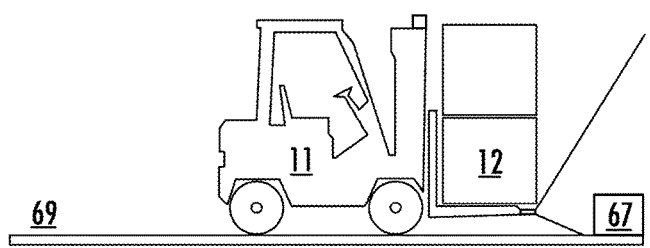
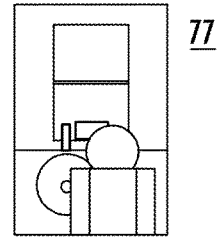
FIG. 7A  FIG. 7B
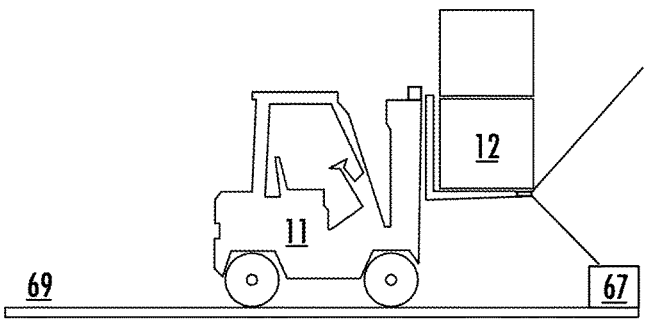
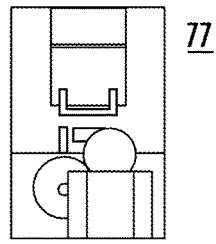
FIG. 8A  FIG. 8B

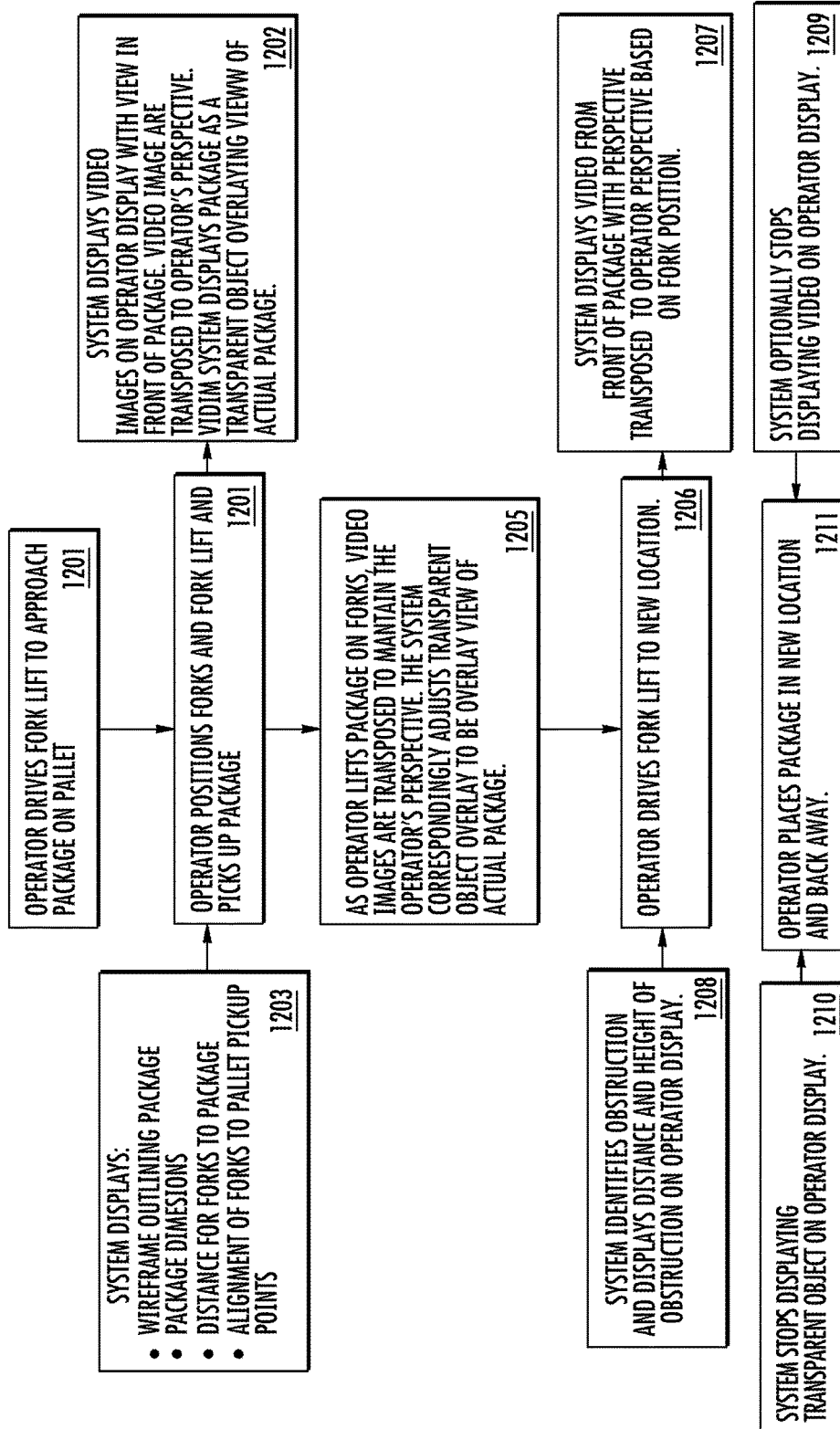

VEHICLE POSITIONING AND OBJECT AVOIDANCE

TECHNOLOGY FIELD

The present invention relates generally to vehicles. More particularly, example embodiments of the present invention relate to controlling a vehicle.

BACKGROUND

Generally speaking, trucks and other vehicles are useful in handling and moving materials. Forklifts, for example, comprise driver-operated self-powered trucks used for lifting, transporting, and positioning material loads in various logistical and industrial environments. The loads may comprise various configurations. For example, the loads may comprise boxes, crates, packages, etc., machinery related items, and/or items secured in a palletized configuration. The environment may comprise a variety of use settings such as a warehouse, plant, factory, shipping center, etc.

Within the use setting, the forklifts are operable for moving the loads from a first location to a second location for storage, use, or subsequent transport elsewhere. At the first location, the driver positions, e.g., a pair of parallel fork components securely beneath the load to be moved. For example, the forks may be inserted within a pair of complimentary recesses within a pallet on which the load is disposed. The forks then lift the load to a height sufficient to allow its movement from the first location, over a deck, floor, or other driving surface to the second location, where it may then be repositioned.

The forklift may be engine-powered, or driven by one or more electric motors. The engine, or an electrical storage battery for energizing lift and drive motors, may be positioned behind a control station from which a driver operates the forklift. Forklifts may be configured with the control station disposed behind the lifting forks, which are positioned at the front. As the forklift moves in a forward direction, the load is carried on the forks ahead of the driver. Depending on its height and the vertical level at which it is carried, the load may thus obstruct at least a portion of the driver's view.

As with vehicles generally, and particularly in view of the weight and other characteristics of a load, the weight and operating speed of the forklift, and characteristics of operational use environment, the safe operation of forklifts depends on the visibility level the drivers are presented while moving the loads. The obstruction of a driver's view by the size of a load presents a heightened risk of collision and related accidents. Higher levels of driver experience may become significant in mitigating the heightened collision risk presented by the load obstructing the driver's vision a demand.

Therefore, it could be useful to improve the view of operators in control of vehicles such as forklifts generally, and in particular, during the lifting and moving of loads therewith. It could also thus be useful to mitigate, or compensate for a blockage, obstruction, occlusion, or other compromise in the view of an operator in control of the vehicle, which may be presented by the load lifted therewith. It could be useful, further, to reduce the risk of possible collision with avoidable obstructions disposed in the path over which the vehicle is moving the load.

SUMMARY

Accordingly, in one aspect, an example embodiment of the present invention relates to improving the view of operators in control of vehicles such as forklifts generally, and in particular, during the lifting and moving of loads therewith. An example embodiment mitigates, and compensates for blockage, obstruction, occlusion, and other compromise over the view of an operator in control of the vehicle, as presented by the load lifted therewith. Example embodiments reduce the risk of possible collision with avoidable obstructions disposed in the path over which the vehicle is moving the load.

An example embodiment relates to a system for presenting information relating to lifting and moving a load object with a vehicle. The system comprises a dimensioner operable, upon the lifting, for determining a size and a shape of the load object, computing a corresponding spatial representation thereof, and generating a first video signal corresponding to the computed spatial representation. The system also comprises an imager operable, during the moving, for observing a scene disposed before a front of the vehicle, relative to a forward direction of motion, and generating a second video signal corresponding to the observed scene, the imager comprising at least one element moveable vertically in relation to the lifting. The system comprises, further, a display operable for rendering a real time visual representation of the observed scene disposed before the front of the vehicle based on the corresponding second video signal and superimposed therewith, a representation of the computed spatial representation of the load object based on the corresponding first video signal.

The foregoing illustrative summary, as well as other example features, functions and/or aspects or features of embodiments of the invention, and the manner in which the same may be implemented or accomplished, are further explained within the following detailed description of example embodiments and each figure ("FIG.") of the accompanying drawings referred to therein.

BRIEF DESCRIPTION OF THE DRAWINGS

FIG. 6A depicts the example vehicle lifting the load in the presence of a second avoidable object, according to an embodiment of the present invention;

FIG. 6B depicts the example vehicle lifting the load in the presence of the second avoidable object from the perspective of the vehicle operator of the vehicle, according to an embodiment of the present invention;

FIG. 7A depicts the example vehicle approaching the second avoidable object, according to an embodiment of the present invention;

FIG. 7B depicts the example vehicle approaching the second avoidable object from the perspective of the vehicle operator of the vehicle, according to an embodiment of the present invention;

FIG. 8A depicts the example vehicle lifting the load over the second avoidable object, according to an embodiment of the present invention;

FIG. 8B depicts the example vehicle lifting the load over the second avoidable object from the perspective of the vehicle operator of the vehicle, according to an embodiment of the present invention;

FIG. 12 depicts an example scenario, in which example embodiments of the present invention may be used.

DESCRIPTION OF EXAMPLE EMBODIMENTS

Figure 1A:
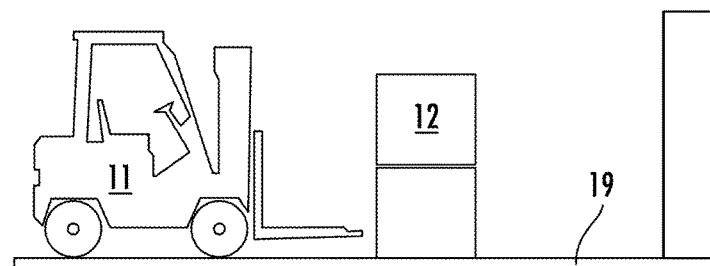
FIG. 1A depicts a typical vehicle approaching a load, with which an example embodiment of the present invention may be used.

Example embodiments of the present invention are described in relation to a system for presenting information relating to lifting and moving a load object with a vehicle. Upon the lifting, a dimensioner determines a size and a shape of the load object, computes a corresponding spatial representation, and generates a corresponding video signal. During the moving, an imager observes a scene in front of the vehicle, relative to its forward motion direction, and generates a video signal corresponding to the observed scene. The imager has at least one element moveable vertically, relative to the lifting. A display renders a real time visual representation of the scene observed in front of the vehicle based on the corresponding video signal and superimposes a representation of the computed spatial representation of the load object.

Overview.

Example embodiments are described in relation to systems and methods for presenting information relating to lifting and moving a load object with a vehicle. The system comprises a dimensioner operable, upon the lifting, for determining a size and a shape of the load object, computing a corresponding spatial representation thereof, and generating a first video signal corresponding to the computed spatial representation. The system also comprises an imager operable, during the moving, for observing a scene disposed before a front of the vehicle, relative to a forward direction of motion, and generating a second video signal corresponding to the observed scene, the imager comprising at least one element moveable vertically in relation to the lifting. The system comprises, further, a display operable for rendering a real time visual representation of the observed scene disposed before the front of the vehicle based on the corresponding second video signal and superimposed therewith, a representation of the computed spatial representation of the load object based on the corresponding first video signal.

The vehicle may comprise a forklift. The forklift comprises a member, such as a movable pair of forks, operable in relation to the lifting of the load. The at least one element of the imager moveable vertically in relation to the lifting is positioned on a portion of the member disposed proximate to the front of the vehicle.

The observation of the scene comprises capturing a real time three-dimensional (3D) image of the scene disposed before the front of the vehicle. The rendering of the real time visual representation of the observed scene disposed before the front of the vehicle is presented at least in relation to a perspective corresponding to the at least one vertically moveable element.

The spatial representation corresponding to the load object may comprise a wireframe computed based on a determination related to a size and a shape of the load object.

In an example embodiment, the dimensioner is operable, further, and prior to the lifting of the load item, for computing a distance between the front of the vehicle and the load item. The display is operable, further, for rendering a representation corresponding to the computed distance.

The imager may comprise a trajectory analyzer operable, upon a detection of one or more avoidable objects positioned over a range within the observed scene disposed before the front of the vehicle, for computing a trajectory relating to the forward motion of the vehicle in relation to each of the avoidable objects. A trajectory signal corresponding to each of the avoidable objects is generated.

Upon the detection of the one or more objects, the rendering of the real time visual representation of the observed scene disposed before the front of the vehicle may comprise presenting a visual representation of the one or more avoidable objects and data relating to the computed trajectory.

An example embodiment may be implemented in which, upon the computed trajectory comprising an imminent risk of a collision with at least one of the avoidable objects, the trajectory analyzer is operable, further, for performing at least one action related to avoiding or ameliorating the collision risk. For example, an alarm may be annunciated in relation to the avoidance and/or amelioration of the collision risk, an evasive action, such as defensive steering, may be initiated, and/or action may be implemented in relation to braking, slowing, and/or stopping the vehicle safely to avoid or ameliorate the collision risk.

In an example embodiment the system may further comprising a plurality of cameras. The multiple cameras are operable in relation to the dimensioner and/or the imager. The cameras comprises the at least one element moveable vertically in relation to the lifting. For example, one of the cameras may be disposed upon a portion of the lifting member disposed proximate to the front of the vehicle. The display is positioned to be observable to an operator, such as the driver, of the vehicle during the lifting and the moving.

The system may be disposed in a vehicle platform and/or operable with a computer and network platform. Example embodiments of the present invention relates to the vehicle platform and to the computer and network platform. The system may be operable for performing a computer related process for presenting information relating to lifting and moving a load object with a vehicle.

An example embodiment of the present invention relates to a method for presenting information relating to lifting and moving a load object with a vehicle. The method may be performed, executed, or implemented by a system, such as the system described herein. An example embodiment relates to a non-transitory computer-readable medium comprising instructions operable for causing, configuring, controlling, or programming one or more processor devices to perform or execute a method for presenting information relating to lifting and moving a load object with a vehicle, such as the method described herein.

Accordingly, in one aspect, an example embodiment of the present invention relates to improving the view of operators in control of vehicles such as forklifts generally, and in particular, during the lifting and moving of loads therewith. An example embodiment mitigates, and compensates for blockage, obstruction, occlusion, and other compromise over the view of an operator in control of the vehicle, as presented by the load lifted therewith. Example embodiments reduce the risk of possible collision with avoidable obstructions disposed in the path over which the vehicle is moving the load.

Example Use Setting.

FIG. 1A depicts a typical vehicle 11 approaching a load 12, with which an example embodiment of the present invention may be used. The vehicle 11 may comprise a forklift. The load 12 is disposed on a solid horizontal surface such as a deck, floor, platform, lot, or road. The vehicle 11 moves over the solid horizontal surface 19 as it approaches the load 12.

Figure 1B:
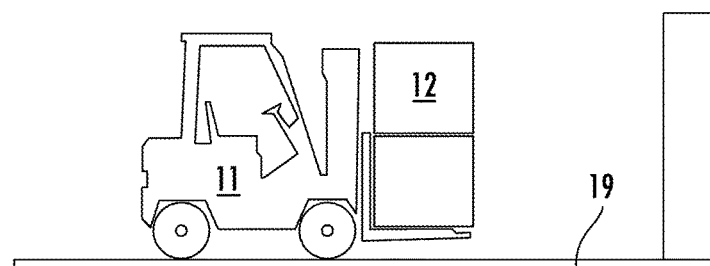
FIG. 1B depicts a typical vehicle lifting a load, with which an example embodiment of the present invention may be used.

As the vehicle 11 approaches proximity with the load 12, the driver (also referred to herein as an "operator") carefully positions a horizontal part of a lifting member beneath the load 12. The operator applies an upward mechanical force to the load 12 with the lifting member, which lifts the load 12 above a plane corresponding to the horizontal surface 19. FIG. 1B depicts a typical vehicle lifting a load, with which an example embodiment of the present invention may be used.

With the load 12 lifted, the operator may then move the load horizontally across the horizontal surface 19 by driving the vehicle 11 forward. However, if the load is tall enough to block or occlude the forward vision of the driver, the presence of an unseen obstruction 17 within the direction of motion of the vehicle 11 may present a risk of a possible collision 13.

Figure 1C:
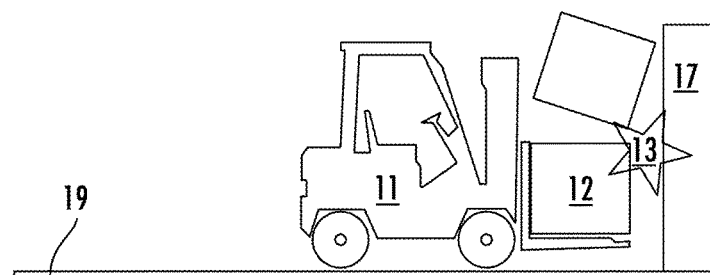
FIG. 1C depicts a possible situation occurrence, which may be avoided with use of an example embodiment of the present invention.

FIG. 1C depicts such a possible situation occurrence, which may be avoided with use of example embodiments of the present invention. The risk of the possible collision 13 may be associated with concomitant safety and damage hazards. An example embodiment of the present invention relates to a system for presenting information relating to lifting and moving a load object with a vehicle.

Example Vehicle Platform.

Figure 1D:
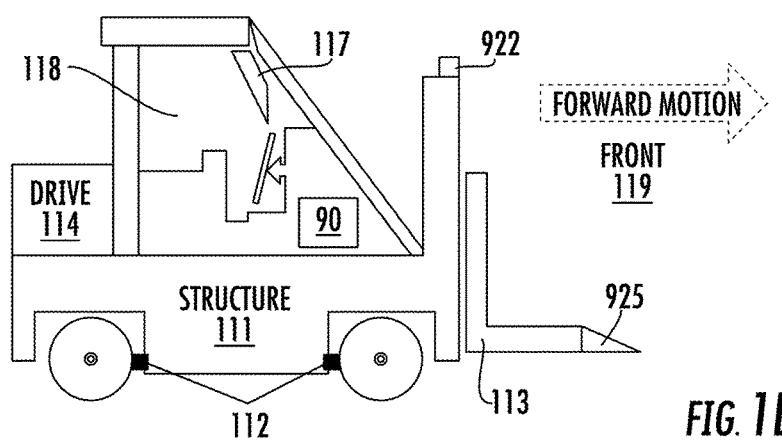
FIG. 1D depicts an example vehicle platform, operable for lifting and moving a load object, according to an embodiment of the present invention.

FIG. 1D depicts an example vehicle platform 11, operable for lifting and moving a load object, according to an embodiment of the present invention. The vehicle 11 may comprise a forklift. The vehicle 11 comprises a structure 111 suspended on a movable frame 112. The vehicle also comprises a lift member 113. The lift member 113 is movably coupled to the structure 111 and operable for lifting the load object. The vehicle 11, further, comprises a drive 114 coupled to the moveable frame 112 and operable for providing a mechanical force for operating the lift member 113 and for moving the vehicle 11 and the lifted load object.

The drive 114 may comprise an engine and gear train coupled to wheels, on which the moveable frame 112 rolls across a horizontal surface, such as a deck, floor, etc. The drive may comprise, alternatively, one or more electrical motors and an electrical storage battery operable for energizing the motor(s). The electrical storage batteries may comprise electrodes, and plates comprising a conductive and electrochemically reactive metallic or metalloid material (e.g., lead) disposed in an array of parallel plates suspended within an electrolyte (e.g., sulfuric acid). Various control components may be associated with the engine related, or the motor related drive 114.

The driver operates the vehicle 11 from an operator station 118. The operator station 118 has an open or window (e.g., windshield) covered view forward, towards the front 119 of the vehicle 11. The forward direction faces a forward direction of motion, in which the vehicle 11 may move the load. The vehicle 11 also comprises a steering mechanism operable for turning at least one set of wheels and turning the direction of motion of the vehicle to the left or the right relative to the forward direction of motion. The vehicle 11 may also be moved and steered in reverse, opposite from the direction of forward motion.

The vehicle comprises, further, a system 90. The system 90 is operable for presenting information relating to the lifting and the moving of the load object and the vehicle. The system 90 comprises at least one element 925, such as a camera operable with an imager, which is moveable vertically in relation to the lifting, is positioned on a portion of the lift member disposed proximate to the front 119 of the vehicle 11. The system 90 may also comprise at least one element 922, such as a camera operable with the imager, which is vertically stationary in relation to the lifting. The system 90 comprises, further, a display 117.

An example embodiment may be implemented in which the display 17 comprises a 'heads-up display' (HUD). The HUD 17 is transparent and allows the driver to look forward, through it. However, the HUD 117 is operable for presenting visual information to the driver, within the forward field of view, without substantially occluding or blocking direct viewing there through.

Example System.

Figure 9:
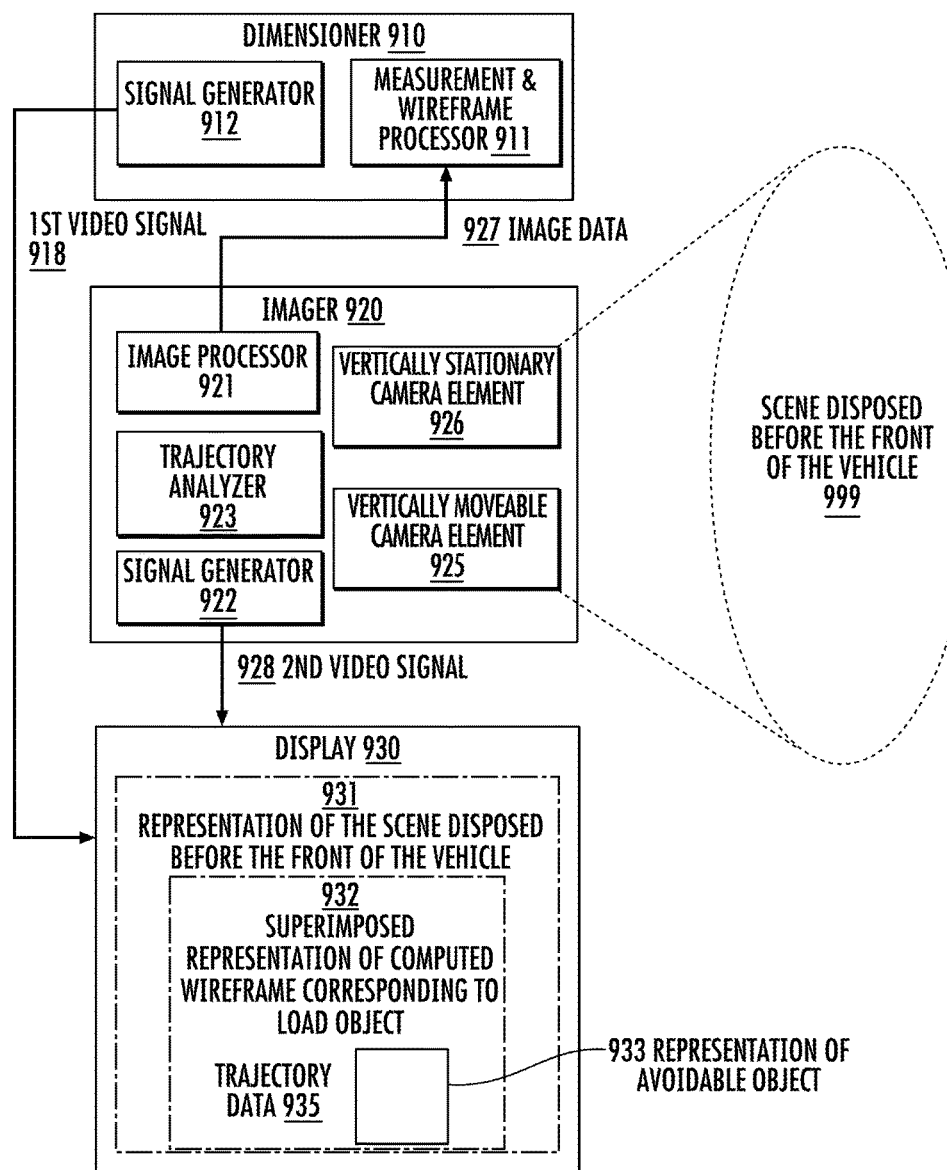
FIG. 9 depicts an example system for presenting information relating to lifting and moving a load object with a vehicle, according to an embodiment of the present invention.

An example embodiment relates to a system for presenting information relating to lifting and moving a load object with a vehicle. FIG. 9 depicts an example system 900 for presenting information relating to lifting and moving a load object with a vehicle, according to an embodiment of the present invention.

The system 900 comprises a dimensioner 910. The dimensioner 910 may comprise a measurement and wireframe processor 911 and a signal generator 912. The dimensioner 910 is operable, upon the lifting, for determining a size and a shape of the load object, computing a corresponding spatial representation thereof, and generating a first video signal 918 corresponding to the computed spatial representation.

The computed spatial representation may comprise a wireframe corresponding to the size and shape of the load object. The size and shape of the load object may be computed based on image data 927 received from an imager. The first video signal 918 may be generated by a signal generator 912.

The system also comprises an imager 920. The imager 920 may comprise a plurality of real time image capture elements, such as 3D video cameras. The image capture elements comprise at least one vertically movable (relative to the lifting of the load object) element 925, which may be disposed with the lift member 113. The image capture elements may comprise, further, a vertically stationary element 926. The image capture elements are operable for capturing a visible scene disposed before the front 119 of the vehicle 11.

Thus, the imager 920 is operable, during the moving, for observing the scene disposed before a front 119 of the vehicle 11, relative to its forward direction of motion. The imager is operable, further, for generating a second video signal 928 corresponding to the observed scene before the front 119 of the vehicle 11.

The imager 920 may also comprise an image processor 921, operable for processing image data captured by the image capture elements. A signal generator 922 may be operable for generating the second video signal 928 based on image data processed by the image processor 921. Moreover, processed image data 927 may be provided from the image processor 921 to the dimensioner 910. The computation of the spatial representation of the load object may thus be based on the processed image data 911.

The system 900 comprises, further, a display 930. The display 930 may comprise the HUD component 117 (FIG. 1D). The display 930 is operable for rendering a real time visual representation 931 of the observed scene disposed before the front 119 of the vehicle 11 based on the corresponding second video signal 928. The display 930 is also operable for rendering, superimposed with the representation 931 of the scene in front of the vehicle 11, a representation 932 of the computed wireframe (or other spatial representation) of the load object based on the corresponding first video signal 918.

The imager may comprise a trajectory analyzer 923. Upon detection of one or more avoidable objects positioned over a range within the observed scene disposed before the front 119 of the vehicle 11, the trajectory analyzer is operable for computing a trajectory relating to the forward motion of the vehicle in relation to each of the avoidable objects. A trajectory signal corresponding to each of the avoidable objects is generated, which may comprise a component of the second video signal 928.

Upon the detection of the one or more objects, the rendering of the real time visual representation of the observed scene disposed before the front of the vehicle may comprise presenting a visual representation 933 of the one or more avoidable objects, and data 935 relating to the computed trajectory.

An example embodiment may be implemented in which, upon the computed trajectory comprising an imminent risk of a collision with at least one of the avoidable objects, the trajectory analyzer 923 is operable, further, for performing at least one action related to avoiding or ameliorating the collision risk. For example, an alarm may be annunciated in relation to the avoidance and/or amelioration of the collision risk, an evasive action, such as defensive steering, may be initiated, and/or action may be implemented in relation to braking, slowing, and/or stopping the vehicle 11 safely to avoid or ameliorate the collision risk.

The system 900 is operable for providing information to the operator of the vehicle 11 in relation to positioning the load object. The system 900 is also operable for providing information to the operator of the vehicle 11 in relation to avoiding collision with objects proximate to the vehicle 11, which may be disposed in front thereof.

Example Positioning and Collision Avoidance Uses.

An example embodiment of the present invention may be implemented for use in lifting, moving, and positioning a load object with a vehicle such as a forklift. FIG. 12 depicts an example scenario 1200, in which example embodiments of the present invention may be used. The example use scenario 1200, depicted in FIG. 12, is described in conjunction with a sequence described with reference to FIG. 2A through FIG. 8B, inclusive.

Figure 2A:
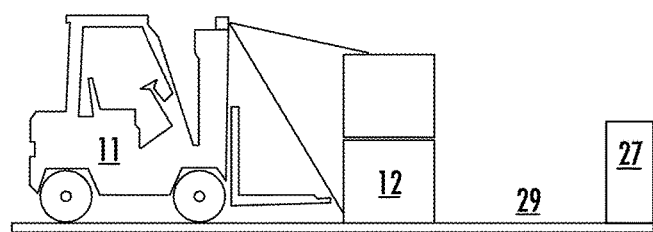
FIG. 2A depicts an example vehicle approach to a load, according to an embodiment of the present invention.
Figure 2B:
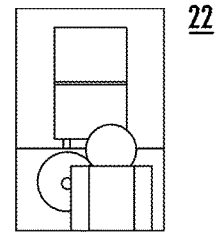
FIG. 2B depicts the example vehicle approach to a load from the perspective of an operator of the vehicle, according to an embodiment of the present invention.

At scenario 1200 part 1201, an operator drives a vehicle 11, such as a forklift, to approach a load object 12, such as a package disposed on a pallet. FIG. 2A depicts an example vehicle 11 approach to a load object 12, according to an embodiment of the present invention. FIG. 2B depicts the example vehicle 11 approach to the load 12 from the perspective 22 of an operator of the vehicle 11, according to an embodiment of the present invention.

The load 12 is disposed on a solid horizontal surface 29. An avoidable obstruction 27 is disposed before the front 119 of the forklift 11, beyond the load object 12. As a forklift 11 is picking up the load object 12, the dimensioner 910 determines its size and shape.

At part 1202 of the scenario, the vertically movable camera element 925 captures images of the scene disposed before the front 119 of the vehicle 11, including the load object 12 and the foreground thereof. The system 900 transposes a view of the captured images of the scene to a perspective consistent with that of the driver's direct view, as it would appear without obstructions, occlusions, or blocked portions of the view. The system presents the transposed view to the driver visually on the HUD 117.

At part 1203 (and effectively at the same time as part 1202), the system 900 displays a spatial representation, such as a wireframe, outlining the load object 12 and data relating to its dimensions, a distance from the front 119 of the lifting member 113 forks to the nearest surface of the load item 12, and an alignment (e.g., including angular displacement data) to pick-up points disposed on the pallet, which comprise locations associated with the load object 12 at which it may be lifted securely, safely, and without damage. Based on the corresponding wireframe, computed by the dimensioner 910 based on the size and shape of the object 12, a transparent representation 33 thereof is presented. The transparent load representation 33 is superimposed by the display 930, e.g., on the HUD 117, in an overlay rendered over the rendered representation of the visual scene disposed before the front 119 of the vehicle 11.

Figure 3A:
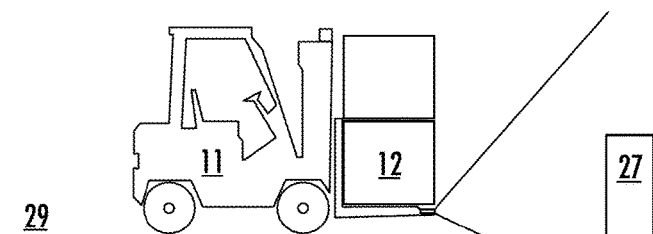
FIG. 3A depicts the example vehicle lifting the load in the presence of a first avoidable object, according to an embodiment of the present invention.
Figure 3B:
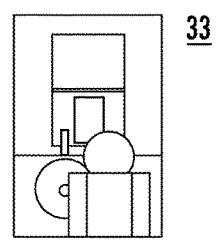
FIG. 3B depicts the example vehicle lifting the load in the presence of the first avoidable object from the perspective of the vehicle operator of the vehicle, according to an embodiment of the present invention.

At part 1204, the driver operates the vehicle 11 to lift the load item 12. FIG. 3A depicts the example vehicle 11 lifting the load 12 in the presence of a first avoidable object 27, according to an embodiment of the present invention. FIG. 3B depicts the example vehicle 11 lifting the load 12 in the presence of the first avoidable object 27 from the perspective of the vehicle operator of the vehicle, according to an embodiment of the present invention.

At part 1206, the driver operates the vehicle 11 to move the load, safely, across the horizontal surface 29, to a new location, which is separated translationally from a location of the original position, at which the load object 12 was lifted. Upon lifting the load item 12 on the fork lifting members 113, the system 900 transposes the transparent representation thereof rendered on the HUD 117 at part 1205 at part 1207.

Figure 4A:
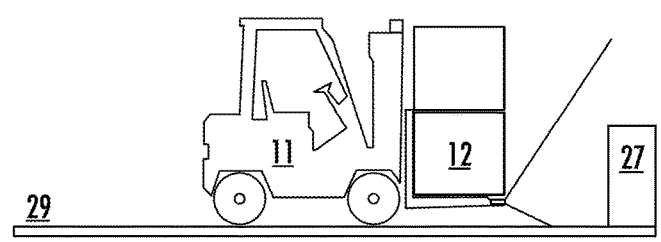
FIG. 4A depicts the example vehicle approaching the first avoidable object, according to an embodiment of the present invention.
Figure 4B:
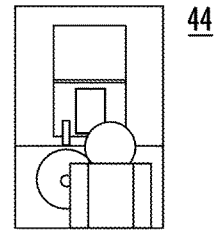
FIG. 4B depicts the example vehicle approaching the first avoidable object from the perspective of the vehicle operator of the vehicle, according to an embodiment of the present invention.

At part 1208, the transposed representation of the load object 12 may comprise a first view of an avoidable obstruction 27, which is disposed within the scene 999 before the front 119 of the vehicle 11. Data may also be displayed in relation to a distance to the avoidable obstruction, and a height thereof. The scene 999 before the front 119 of the vehicle 11, at part 1205, is also transposed to the view corresponding to a clear, direct perspective of the operator. FIG. 4A depicts the example vehicle 11 approaching the first avoidable object, according to an embodiment of the present invention. FIG. 4B depicts the example vehicle approaching the first avoidable object from the perspective 44 of the vehicle operator of the vehicle, according to an embodiment of the present invention.

The representation of the avoidable object 27 may be highlighted, e.g., using color, brightness, contrast and other display control techniques, to call direct the operator's attention thereto. Data may also be displayed in relation to a distance to the avoidable obstruction, and a height thereof.

Figure 5A:
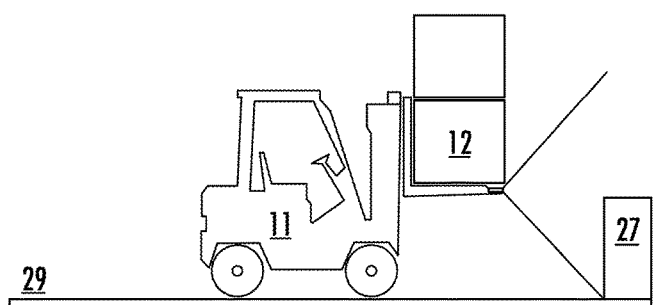
FIG. 5A depicts the example vehicle lifting the load over the first avoidable object, according to an embodiment of the present invention.
Figure 5B:
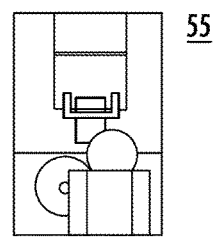
FIG. 5B depicts the example vehicle lifting the load over the first avoidable object from the perspective of the vehicle operator of the vehicle, according to an embodiment of the present invention.

FIG. 5A depicts the example vehicle lifting the load over the first avoidable object, according to an embodiment of the present invention. FIG. 5B depicts the example vehicle lifting the load over the first avoidable object from the perspective 55 of the vehicle operator, according to an embodiment of the present invention. Thus, the driver may operate the lift member 113 to lift the load 12 to a height sufficient to avoid the avoidable object 27 and/or place the load object 12 securely and safely thereon, or proximate to.

FIG. 6A depicts the example vehicle lifting the load in the presence of a second avoidable object, according to an embodiment of the present invention. FIG. 6B depicts the example vehicle lifting the load in the presence of the second avoidable object from the perspective 66 of the vehicle operator of the vehicle, according to an embodiment of the present invention.

FIG. 7A depicts the example vehicle approaching the second avoidable object, according to an embodiment of the present invention. FIG. 7B depicts the example vehicle approaching the second avoidable object from the perspective 77 of the vehicle operator of the vehicle, according to an embodiment of the present invention.

FIG. 8A depicts the example vehicle lifting the load over the second avoidable object, according to an embodiment of the present invention. FIG. 8B depicts the example vehicle lifting the load over the second avoidable object from the perspective 88 of the vehicle operator of the vehicle, according to an embodiment of the present invention. Thus, example embodiments allow operators to reduce the risk of collision with avoidable objects disposed before the front 119 of the vehicle 11 as the load object is moved therewith.

The vertically movable camera 925 in the lifting member 113 (e.g., forks) captures a view of what is disposed forward of the front 119 of the forklift. A trajectory analysis is performed on the view, e.g., using the trajectory analyzer 923. The view of the scene before the front 119 of the forklift 11 available to the direct sight of the operator may be blocked or occluded by the load object 12 as it is carried by the forklift 11. In an example embodiment however, this view is overlaid on the HUD 117, which renders the object 12 that the forklift 11 is carrying, appear transparent in the representation thereof. Thus, the scene before the front 119 of the forklift is effectively cleared, as viewed on the HUD 117.

The 3D camera 925 associated with the dimensioner 910 and/or the imager 920, and disposed in the forks or other lifting members 113, identifies objects within a pre-specified range forward of the front 119 of the forklift 11. The display 930 is thus operable for overlaying a red (or other colored, or high-contrast) outline around the object on the HUD 117, which helps identify the avoidable objects visually to the driver. The dimensioner may also provide trajectory data 935 therewith such as a distance to the avoidable object 27. Using the vertically movable camera element 925, the system 900 thus accommodates moving and movable forks, and forks that are placed at different heights.

Upon placing the load object 12 in the new location, the system 900 may, at part 1209, stop or pause from presenting real time video of the scene 999 actively on the HUD 117. Effectively simultaneously at part 1210, the system 900 may pause or stop from presenting the transparent superimposition of the package 12 on the HUD 117. The attention of the driver may then be directed rearward at part 1211, and the vehicle 11 may be operated in a reverse direction relative to its front 119, and the system 900 may report, automatically, via a network to a remote computer (FIG. 11) and/or update therewith. The attention of the operator may then be directed to re-tasking.

Example Process.

Figure 10:
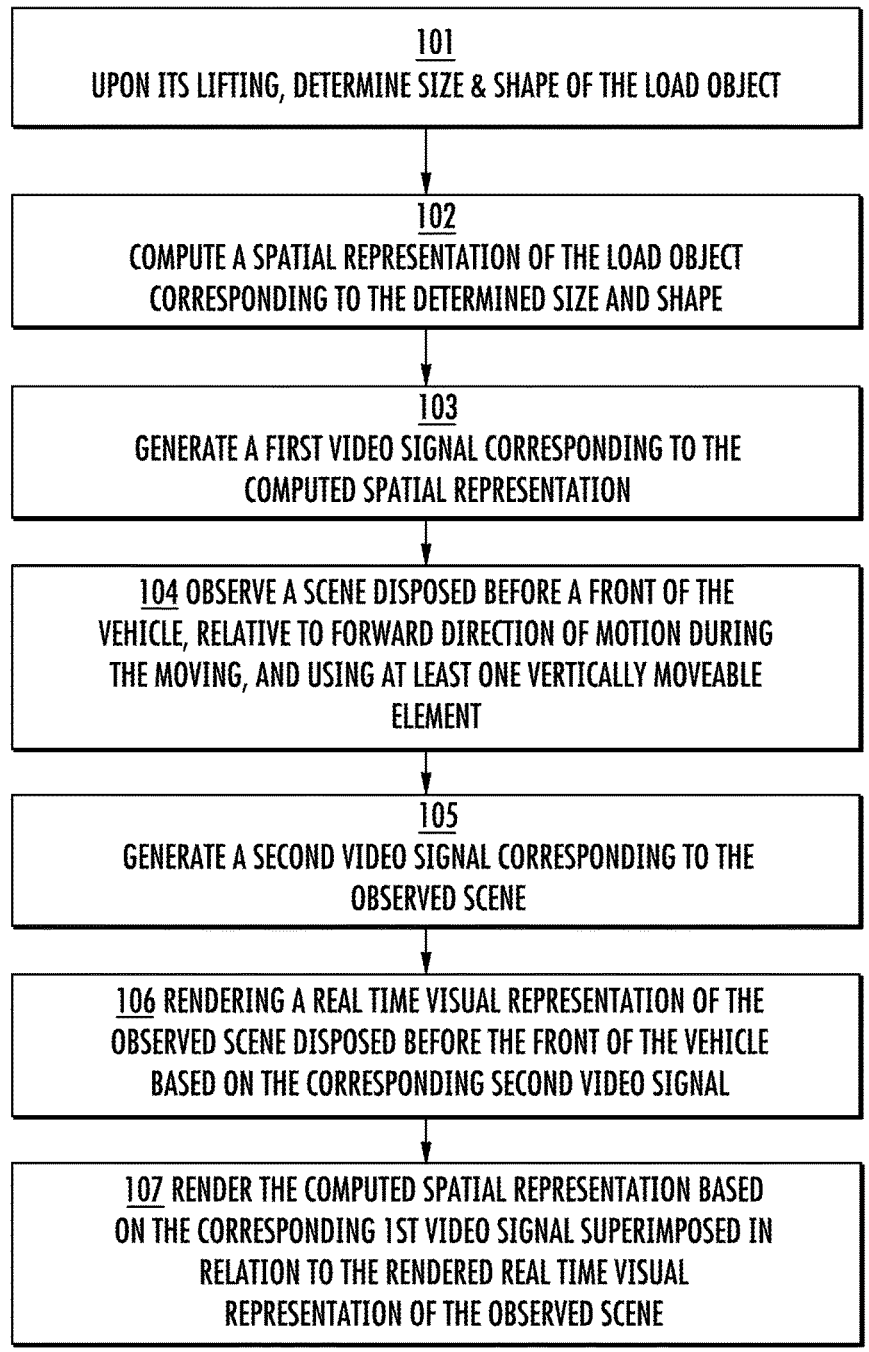
FIG. 10 depicts a flowchart for an example method for presenting information relating to lifting and moving a load object with a vehicle, according to an embodiment of the present invention.

An example embodiment of the present invention relates to a computer-implemented process. FIG. 10 depicts a flowchart for an example method 100 for presenting information relating to lifting and moving a load object with a vehicle, according to an embodiment of the present invention.

Step 101 comprises determining, upon the lifting, a size and a shape of the load object.

Step 102 comprises computing a spatial representation of the load object corresponding to the determined size and shape thereof. The step 102 of computing the spatial representation corresponding to the load object comprises computing a wireframe representation of the load item based on the determined size and shape thereof.

Step 103 comprises generating a first video signal corresponding to the computed spatial representation.

Step 104 comprises observing, during the moving and using at least one element moveable vertically in relation to the lifting, a scene disposed before a front of the vehicle, relative to a forward direction of motion. The observing the scene step 104 may comprise capturing a real time 3D image of the scene disposed before the front 119 of the vehicle 11.

Step 105 comprises generating a second video signal corresponding to the observed scene.

Step 106 comprises rendering a real time visual representation of the observed scene disposed before the front of the vehicle based on the corresponding second video signal.

Step 107 comprises rendering the computed spatial representation based on the corresponding first video signal, the rendered computed spatial representation of the load object superimposed in relation to the rendered real time visual representation of the observed scene disposed before the front of the vehicle.

The step 106 of rendering of the real time visual representation of the observed scene disposed before the front 119 of the vehicle 11 is presented at least in relation to a perspective corresponding to the at least one vertically moveable element 925.

In an example embodiment, the method 100 may also comprise computing, prior to the lifting of the load item, a distance between the front of the vehicle and the load item.

A representation of data corresponding to the computed distance may be rendered by the display 930.

An example embodiment may be implemented in which the determining the size and a shape of the load object step 101, the observing the scene disposed before the front of the vehicle step 104, and/or the computation of the distance between the front of the vehicle and the load item may comprise processing image data captured with a plurality of cameras. The cameras comprise the at least one element 925, which is moveable vertically in relation to the lifting.

An example embodiment may be implemented in which the method 100 further comprises analyzing the observed scene disposed before the front of the vehicle. Based on the analysis of the observed scene, a presence of one or more avoidable objects is detected, which are positioned over a range within the observed scene disposed before the front of the vehicle. A trajectory is computed relating to the forward motion of the vehicle in relation to each of the avoidable objects and a corresponding trajectory signal generated in relation to each of the avoidable objects. A visual representation of the one or more avoidable objects is rendered, along with data relating to the computed trajectory.

Upon the computed trajectory comprising an data indicative of an imminent risk of a collision with at least one of the avoidable objects, at least one action may be performed in relation to avoiding (or ameliorating) the collision. Example embodiments may be implemented in which the actions performed in avoidance (or amelioration) of the possible collision comprise annunciating an alarm related to the avoiding of the collision, initiating an evasive action such as careful evasive steering, and/or carefully braking, slowing, and/or stopping the vehicle.

Example Computer & Network Platform.

Figure 11:
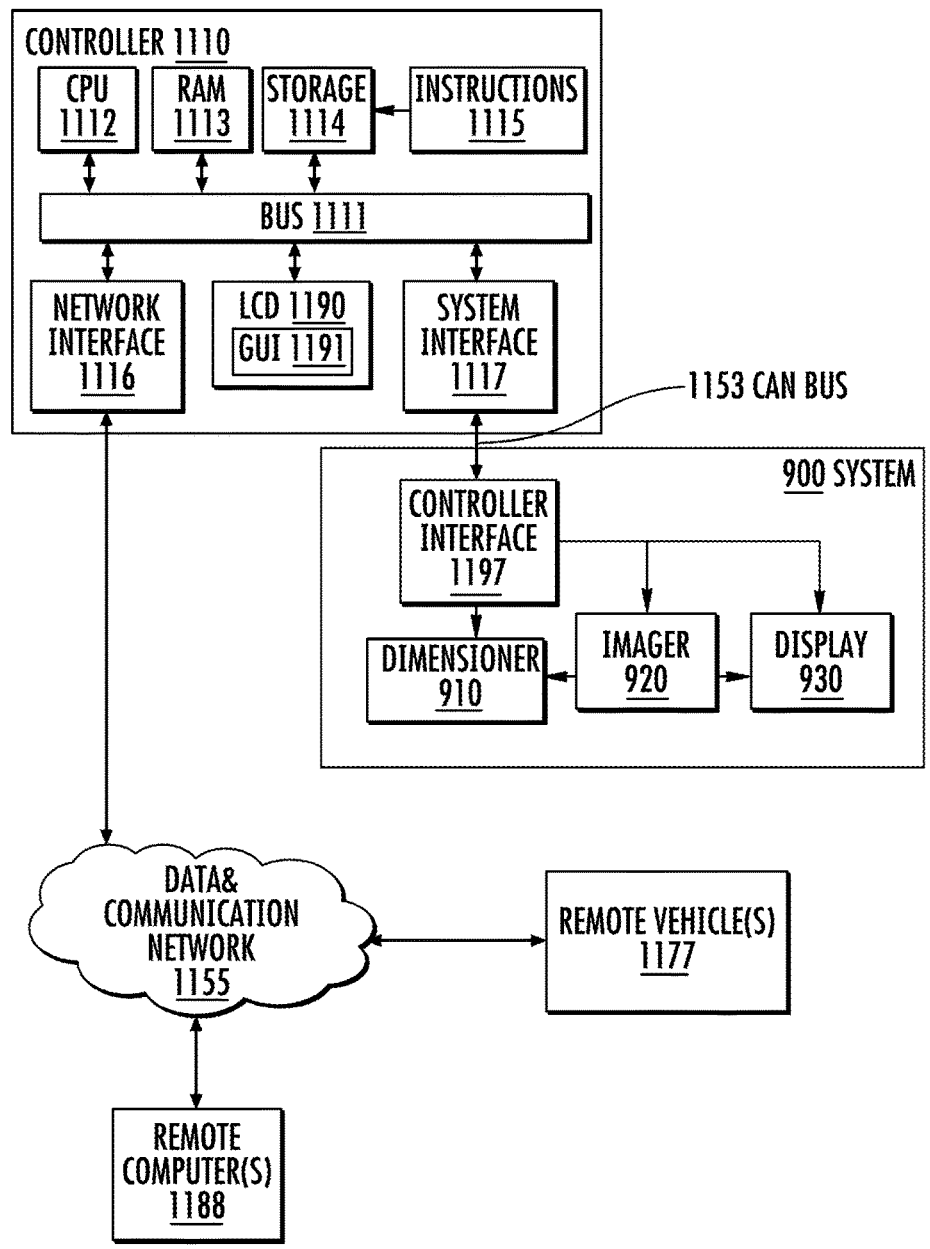
FIG. 11 depicts an example computer and network platform, according to an embodiment of the present invention may be practiced.

An example embodiment of the present invention relates to a computer and network platform. FIG. 11 depicts an example computer and network platform 1100, with which an embodiment of the present invention may be practiced.

An example embodiment may be implemented in which one or more components of the information presentation system 900 comprise (or are configured in) electronic or computer based hardware, firmware and software stored physically (e.g., electrically, electronically, optically, electromagnetically, magnetically) in non-transitory computer readable storage media such as dynamic memory, flash memory, drives, caches, buffers, registers, latches, memory cells, or the like.

In an example embodiment of the present invention, the system 900 comprises a control area network (CAN) bus 1153 and a controller interface 1197. The CAN bus 1153 is operable for exchanging data signals between a plurality of electronic components of the system 900.

For example, the CAN bus 1153 may be operable for allowing an exchange of signals between the dimensioner 910 and the imager 920 and display 930, and between the imager 920, the dimensioner 910, and the display 930. The CAN bus 1153 is also operable for exchanging signals between the dimensioner 910, the imager 920, the display 930, and the controller interface 1197.

The controller interface 1197 is operable for exchanging signals between the system 900 and a control computer ("controller") 1110. The CAN bus 1153 is operable, further, for exchanging signals between the controller interface 1197 and a system interface 1117 of the controller 1110.

The controller 1110 is operable for exchanging data signals with the system 900. For example, the controller 1110 may transmit commands to the system 900, receive signals therefrom, and update software associated therewith.

The controller 1110 comprises a data bus 1111. The controller 1110 also comprises a central processor unit (CPU) 1112, a memory, such as a dynamically-operable random access memory (RAM) 1113, and a data storage unit 1114. The data bus 1111 is operable for exchanging signals between the components of the computer 1110. The data storage unit 1114, and the RAM 813, may comprise non-transitory computer-readable storage media.

The non-transitory computer-readable storage media may comprise instructions 1115. The instructions 1115 may be operable for causing, configuring, controlling, and/or programming operations of the system 900, and an information presentation process such as the method 100 (FIG. 10).

The controller 810 may also comprise a statically-operable memory such as a read-only memory ('ROM'), and one or more additional processors, the operations of which may relate to image processing, graphic processing ('GPU'), digital signal processing ('DSP'), and/or mathematics ('Math') co-processing, which may each be performed with an associated, dedicated, and/or shared dynamic memory. The controller 1110 may also comprise input receiving devices, including electromechanically and/or electromagnetically-actuated switches, sensors, etc.

The controller 810 may comprise a liquid crystal display (LCD) device 1190. An example embodiment may be implemented in which the LCD 1190 comprises a graphical user interface (GUI) 1191, which is operable for receiving haptic user inputs applied over portions of a surface of a viewing area of the LCD 1190. The controller 810 may also comprise a network interface 815. An example embodiment may also (or alternatively) be implemented in which the LCD 1190 is associated, or operable in conjunction, with the HUD 117 and the display 930. The controller 1110 also comprises a network interface 1116.

The network interface 1116 is operable for coupling and exchanging data, communicatively, with a data and communication network 1155. One or more remote vehicles 1177 and/or remote computers 1188 may be coupled, communicatively, via the network 1155, and/or interact with the controller 1100, and/or with an operation of the system 900. Thus, the system 900 may be operable within a larger system, more generalized context, and wider use environments, such as may relate to logistics, commerce, shipping, storage, transport, material handling, etc.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;

U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;

U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;

U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILEPHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 1, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);
U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Example embodiments of the present invention are thus described in relation to presenting information relating to lifting and moving a load object with a vehicle. Upon the lifting, a dimensioner determines a size and a shape of the load object, computes a corresponding spatial representation, and generates a corresponding video signal. During the moving, an imager observes a scene in front of the vehicle, relative to its forward motion direction, and generates a video signal corresponding to the observed scene. The imager has at least one element moveable vertically, relative to the lifting. A display renders a real time visual representation of the scene observed in front of the vehicle based on the corresponding video signal and superimposes a representation of the computed spatial representation of the load object.

Example embodiments of the present invention are thus useful for improving the view of operators in control of vehicles such as forklifts generally, and in particular, during the lifting and moving of loads therewith. Example embodiments mitigate, and compensate for blockage, obstruction, occlusion, and other compromise over the view of an operator in control of the vehicle, as presented by the load lifted therewith. Example embodiments reduce the risk of possible collision with avoidable obstructions disposed in the path over which the vehicle is moving the load.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are neither necessary for describing example embodiments of the invention, nor particularly relevant to understanding of significant elements, features, functions, and aspects of the example embodiments described herein.

In the specification and/or figures, typical embodiments of the invention have been disclosed. The present invention is not limited to such example embodiments. The use of the term "and/or" includes any and all combinations of one or more of the associated listed items, and the term "or" is used in an inclusive (and not exclusive) sense. The figures are schematic representations and so are not necessarily drawn to scale. Unless otherwise noted, specific terms have been used in a generic and descriptive sense and not for purposes of limitation.

What is claimed, is:

1. A system, comprising:
    a dimensioner operable, upon lifting of a load object, for determining a size and a shape of the load object, computing a corresponding spatial representation of the load object, and generating a first video signal corresponding to the computed spatial representation;
    an imager operable, during moving of the load object, for observing a scene disposed before a front of a vehicle, relative to a forward direction of motion, and generating a second video signal corresponding to the observed scene, the imager comprising at least one element moveable vertically in relation to the lifting; and
    a display operable for rendering a real time visual representation of the observed scene disposed before the front of the vehicle based on the corresponding second video signal, the visual representation transposed to a perspective consistent with the direct view of an operator of the vehicle, and superimposed with the visual representation of the observed scene, a transparent representation of the computed spatial representation of the load object based on the corresponding first video signal.

2. The system as described in claim 1 wherein the vehicle comprises a forklift, the forklift comprising a member operable in relation to the lifting of the load, and wherein the at least one element of the imager moveable vertically in relation to the lifting is positioned on a portion of the member disposed proximate to the front of the vehicle.

3. The system as described in claim 1 wherein the observing the scene comprises capturing a real time three dimensional (3D) image of the scene disposed before the front of the vehicle, and wherein the rendering of the real time visual representation of the observed scene disposed before the front of the vehicle is presented at least in relation to a perspective corresponding to the at least one vertically moveable element.

4. The system as described in claim 1 wherein the spatial representation corresponding to the load object comprises a wireframe computed based on the determined size and shape of the load object.

5. The system as described in claim 1 wherein the dimensioner is operable, further, and prior to the lifting of the load item, for computing a distance between the front of the vehicle and the load item, and wherein the display is operable, further, for rendering a representation corresponding to the computed distance.

6. The system as described in claim 1 wherein the imager comprises a trajectory analyzer operable, upon a detection of one or more avoidable objects positioned over a range within the observed scene disposed before the front of the vehicle, for computing a trajectory relating to the forward motion of the vehicle in relation to each of the avoidable objects and generating a trajectory signal corresponding to each of the avoidable objects.

7. The system as described in claim 6 wherein, upon the detection of the one or more objects, the rendering of the real time visual representation of the observed scene disposed before the front of the vehicle comprises presenting a visual representation of the one or more avoidable objects and data relating to the computed trajectory.

8. The system as described in claim 7 wherein, upon the computed trajectory comprising an imminent risk of a collision with at least one of the avoidable objects, the trajectory analyzer is operable, further, for performing at least one action related to avoiding the collision.

9. The system as described in claim 1, further comprising a plurality of cameras, the cameras operable in relation to the dimensioner or the imager, and comprising the at least one element moveable vertically in relation to the lifting.

10. The system as described in claim 1 wherein the display is observable to an operator of the vehicle during the lifting and the moving.

11. A method comprising the steps of:
    determining, upon lifting a load object with a vehicle, a size and a shape of the load object;
    computing a spatial representation of the load object corresponding to the determined size and shape of the load object;
    generating a first video signal corresponding to the computed spatial representation;
    observing, during moving the load object with the vehicle and using at least one element moveable vertically in relation to the lifting, a scene disposed before a front of the vehicle, relative to a forward direction of motion;
    generating a second video signal corresponding to the observed scene;
    rendering a real time visual representation of the observed scene disposed before the front of the vehicle based on the corresponding second video signal, the visual representation transposed to a perspective consistent with the direct view of an operator of the vehicle; and
    rendering a transparent representation of the computed spatial representation of the load object based on the corresponding first video signal, the rendered transparent representation of the computed spatial representation of the load object comprising a wireframe corresponding to the determined size and shape of the load object superimposed in relation to the rendered real time visual representation of the observed scene disposed before the front of the vehicle.

12. The method as described in claim 11 wherein the vehicle comprises a forklift, the forklift comprising a member operable in relation to the lifting of the load, and wherein the at least one element of the imager moveable vertically in relation to the lifting is positioned on a portion of the member disposed proximate to the front of the vehicle.

13. The method as described in claim 11 wherein the observing the scene step comprises capturing a real time three dimensional (3D) image of the scene disposed before the front of the vehicle, and wherein the step of rendering of the real time visual representation of the observed scene disposed before the front of the vehicle is presented at least in relation to a perspective corresponding to the at least one vertically moveable element.

14. The method as described in claim 11 wherein the step of computing the spatial representation corresponding to the load object comprises computing a wireframe representation of the load item based on the determined size and shape thereof.

15. The method as described in claim 11, further comprising the steps of:
    computing, prior to the lifting of the load item, a distance between the front of the vehicle and the load item; and
    rendering a representation of data corresponding to the computed distance.

16. The method as described in claim 15 wherein the determining the size and a shape of the load object step, the observing the scene disposed before the front of the vehicle step, and the computing the distance between the front of the vehicle and the load item step, comprise a step of processing image data captured with a plurality of cameras, the cameras comprising the at least one element moveable vertically in relation to the lifting.

17. The method as described in claim 11, further comprising the steps of:
   analyzing the observed scene disposed before the front of the vehicle;
   detecting, based on the analysis of the observed scene, a presence of one or more avoidable objects positioned over a range within the observed scene disposed before the front of the vehicle;
   computing a trajectory relating to the forward motion of the vehicle in relation to each of the avoidable objects;
   generating a trajectory signal corresponding to each of the avoidable objects;
   rendering, further, a visual representation of the one or more avoidable objects and data relating to the computed trajectory; and
   performing, upon the computed trajectory comprising a data indicative of an imminent risk of a collision with at least one of the avoidable objects, at least one action related to avoiding the collision.

18. The method as described in claim 17 wherein the step of performing the at least one action related to avoiding the collision comprises one or more of:
   annunciating an alarm related to the avoiding of the collision;
   initiating an evasive action; or
   one or more of braking, slowing, or stopping the vehicle.

19. A vehicle, comprising:
   a structure suspended on a movable frame;
   a lift member movably coupled to the structure and operable for lifting a load object;
   a drive coupled to the moveable frame and operable for providing a mechanical force for operating the lift member and for moving the vehicle and the lifted load object; and
   a system for presenting information relating to the lifting and the moving of the load object and the vehicle, the system comprising:
      a dimensioner operable, upon the lifting, for determining a size and a shape of the load object, computing a corresponding spatial representation of the load object, and generating a first video signal corresponding to the computed spatial representation;
      an imager operable, during the moving, for observing a scene disposed before a front of the vehicle, relative to a forward direction of motion, and generating a second video signal corresponding to the observed scene, the imager comprising at least one element moveable vertically in relation to the lifting; and
      a display operable for rendering, a real time visual representation of the observed scene disposed before the front of the vehicle based on the corresponding second video signal, the visual representation transposed to a perspective consistent with the direct view of an operator of the vehicle, and superimposed with the visual representation of the observed scene, a transparent representation of the computed spatial representation of the load object based on the corresponding first video signal.

20. The vehicle as described in claim 19 wherein the wherein the vehicle comprises a forklift, and wherein the at least one element of the imager moveable vertically in relation to the lifting is positioned on a portion of the lift member disposed proximate to the front of the vehicle.

* * * * *